(12) United States Patent
Rye et al.

(10) Patent No.: US 7,705,863 B2
(45) Date of Patent: Apr. 27, 2010

(54) SYSTEMS AND METHODS FOR RENDERING BUILDING SPACES

(75) Inventors: Jeffrey M. Rye, Roseville, MN (US); Thomas S. Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 320 days.

(21) Appl. No.: 11/274,443

(22) Filed: Nov. 15, 2005

(65) Prior Publication Data

US 2007/0124119 A1  May 31, 2007

(51) Int. Cl.
G09G 5/12 (2006.01)
(52) U.S. Cl. ..................................................... 345/649
(58) Field of Classification Search ................... 345/649
See application file for complete search history.

(56) References Cited

U.S. PATENT DOCUMENTS

| | | | | |
|---|---|---|---|---|
| 5,832,680 | A * | 11/1998 | Muroi | 52/169.6 |
| 6,420,698 | B1 * | 7/2002 | Dimsdale | 250/234 |
| 6,681,140 | B1 * | 1/2004 | Heil | 700/95 |
| 7,158,135 | B2 * | 1/2007 | Santodomingo et al. | 345/428 |
| 2002/0018061 | A1 * | 2/2002 | Gantt | 345/419 |
| 2002/0038529 | A1 * | 4/2002 | Nelson | 52/2.22 |
| 2003/0164567 | A1 * | 9/2003 | Coe | 264/40.1 |
| 2003/0190589 | A1 * | 10/2003 | Lechner | 434/43 |
| 2004/0145614 | A1 | 7/2004 | Takagaki | |
| 2005/0002662 | A1 | 1/2005 | Arpa | |
| 2005/0171754 | A1 * | 8/2005 | Santodomingo et al. | 703/21 |
| 2006/0136180 | A1 * | 6/2006 | Hansen et al. | 703/1 |
| 2006/0188143 | A1 * | 8/2006 | Strassenburg-Kleciak | 382/154 |
| 2007/0107371 | A1 * | 5/2007 | Plocher et al. | 52/745.05 |
| 2007/0132756 | A1 * | 6/2007 | Plocher et al. | 345/420 |

OTHER PUBLICATIONS

Jürgen Döllner, Henrik Buchholz, title of : Virtual reality and 3D: Continuous level-of-detail modeling of buildings in 3D city models, Nov. 2005.*
Kjeld Schmidt, title of : Field studies I: Ordering systems: coordinative practices in architectural design and planning, Nov. 2003.*
Jayesh Govindarajan, Matthew Ward, Jonathan Barnett, title of: Visualizing simulated room fires (case study), Oct. 1999.*
Shigeru Owada, Frank Nielsen, Makoto Okabe, Takeo Igarashi, Volumetric illustration: designing 3D models with internal textures, Aug. 2004.*
International Search Report from corresponding PCT application, Application No. PCT/US 06/41671, published on Jul. 23, 2007.

* cited by examiner

*Primary Examiner*—Javid A Amini
(74) *Attorney, Agent, or Firm*—Husch Blackwell Sanders Welsh & Katz

(57) ABSTRACT

A method and system of rendering buildings in three-dimensional space first renders a respective floor, then adds objects and finally walls to bound each of the floors. The result, a three-dimensional rendering of a building, has translucent walls and illustrates the position of objects within the building in addition to presenting the overall shape of the building. The building can be rotated or enlarged to clarify the position of the various objects in space.

32 Claims, 10 Drawing Sheets

SYSTEMS AND METHODS FOR RENDERING BUILDING SPACES

FIELD

The invention pertains to the creation and presentation of three-dimensional images on two-dimensional graphical displays. More particularly, the invention pertains to systems and methods for generating three-dimensional renderings of building spaces and presenting same on two-dimensional graphical display devices.

BACKGROUND

Known software and hardware is available for rendering various types of three-dimensional images including building spaces. Known methods and systems at times do not clearly or accurately depict the location of objects in a rendered image of a building. Further, at times the positional relationships of objects to one another, when the objects are located on multiple floors, are not always clearly depicted.

Known systems include the use of graphics hardware to attempt to generate accurate three-dimensional images. Other known methods seek to improve accuracy by rendering the back walls first. The objects in the floors are then drawn. Finally, the front walls are rendered. Such processes can suffer from performance penalties other drawbacks.

Known systems and methods often do not accurately render transparency and depth simultaneously in a three-dimensional structure unless the polygons used to create the images are rendered from back to front. However, in such processes, sorting of polygons can be either inefficient or unfeasible due to time and depth processing requirements. Thus, errors can arise from currently used techniques for transparency which ignore depth or techniques for testing depth which ignore transparency.

There continues to be an ongoing need for systems and methods for rendering multi-dimensional building spaces accurately. Preferably it will be possible to accurately locate objects on the respective floor or floors as well as accurately render transparency and depth simultaneously without having to sort polygons.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Systems and methods which embody the present invention provide renderings of three-dimensional, multiple story buildings using a translucent representation of the building. The location of objects within or on various floors, can be depicted. Such objects include interior walls, smoke detectors, evacuation stairs, elevators, hazardous materials, and doors without limitation.

Further in accordance with the invention, the building representations can be rendered in a translucent light grey color. The preferred color prevents the rendered wall from discoloring or occluding icons which are used to represent objects throughout the building. Preferably the floors will be rendered darker than the walls. This has the particular advantage that the darker floors visually anchor the objects to a particular floor and space such that they do not appear to "float".

In one aspect, control software can rotate the representation of the building or object about a vertical axis. Continuously changing the visual parallax can further convey the positions of objects in space along with depth and distance relationships.

In another aspect of the invention, floors of a building are rendered from bottom to top. Preferably each floor is rendered first without any need for depth testing. Objects can then be positioned on the floor with depth testing. Finally, the walls can be generated without depth testing.

Where wall transparency is relatively faint, any inaccuracies due to displaying walls behind an object for the same floor on which the objects reside may contribute color to the object. However, such inaccuracies are substantially undetectable where the wall transparency is faint.

In a further aspect of the invention, the state of various objects within the building, such as ambient condition detectors, can be presented in substantially real-time for use in establishing fire location, direction and extent in the rendered structure all without limitation. The location of first responders on various floors can also be displayed substantially in real-time.

By means of a graphical interface a user can start or stop rotation of the building being presented, or zoom in and out along a line from a fixed viewpoint to better understand the relationships between the various objects and floors of the building.

In yet another aspect of the invention, a multi-story building can be rendered, for example in a fire situation display, for use by first responders to assess the location and extent of a fire condition. Such a display can also be used to locate what might be multi-story paths to the fire for purposes of suppressing same as well as paths to individuals located throughout the building for purposes of assisting them to safely leave the premises.

Figure 1:
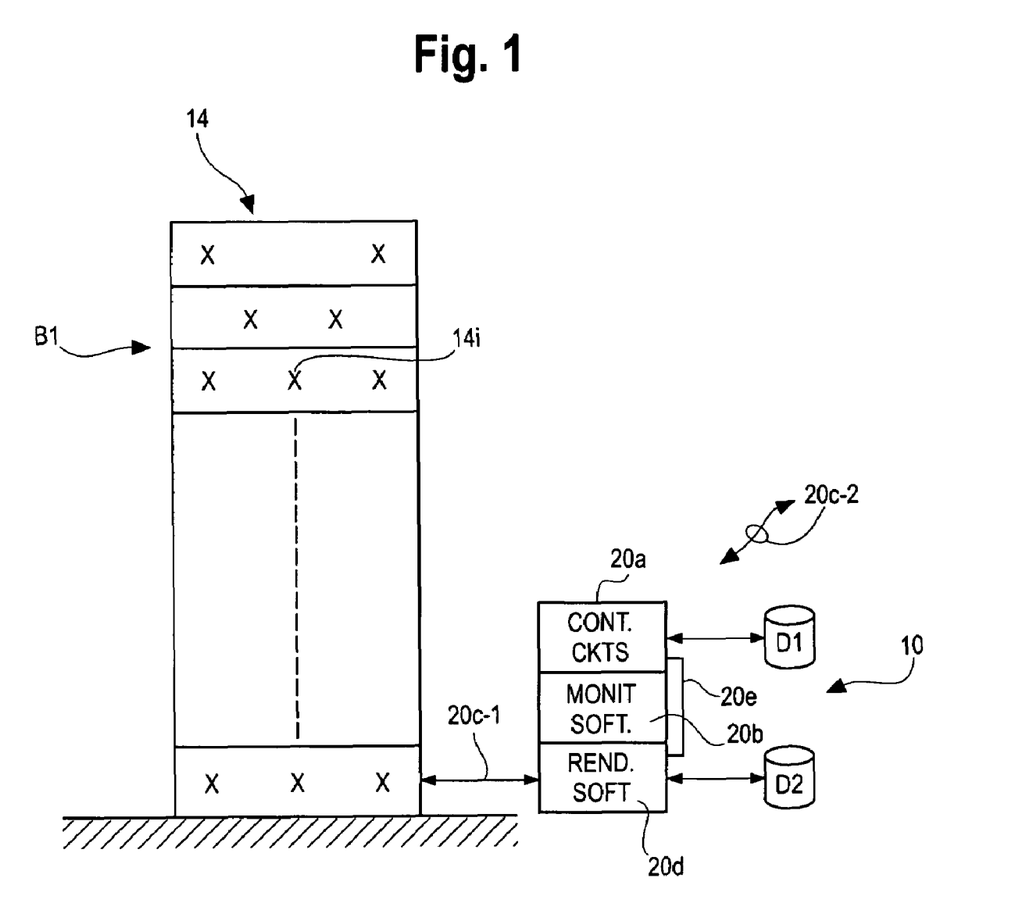
FIG. 1 is block diagram of a system in accordance with the invention.

FIG. 1 illustrates a system 10 which might be distributed throughout a plurality of floors of a building B1 for purposes of monitoring various conditions throughout the building. Representative conditions could include fire, smoke, gas, operation of a HVAC systems, illumination systems, and/or security systems all without limitation.

System 10 could incorporate a plurality of ambient condition detectors scattered throughout the building indicated generally at 14 for purposes of monitoring various conditions throughout the building of B1. Signals that pertain to outputs from detectors 14 could be coupled to a fire situation control and display unit 18. The unit 18 could be in wired or wireless communication with various of the detectors 14 scattered throughout the building B1.

Information pertaining to conditions within the building B1 could be presented one or more local visual displays. Such displays could provide information pertaining to the state of one or more of the members 14*i* of the plurality 14 of ambient condition detectors.

Unit 18 can be implemented with control circuits 20*a* which could include one or more programmable processors. It will be understood that the processors need not all be located physically near one another. They could communicate via one or more networks.

Unit 18 can also include control software 20*b* executable by one or more of the processors of control circuits 20*a*. The software 20*b* implements communications with the plurality of ambient condition detectors 14, as well as other displaced devices via a wired and/or wireless medium indicated generally at 20*c*-1. Communications can be provided to other sites via a wired or wireless medium 20*c*-2.

The unit 18 can also include software 20*d*, discussed in more detail subsequently, for presenting one or more renderings of the building B1. The renderings can be presented locally on a two-dimensional visual display unit 20*e* which can be viewed by first responders in the vicinity for purposes of understanding the layout of the building B1, including location of stairways and elevators in the building, location and arrangement of the members of the plurality of detectors 14. Those detectors which are emitting indications of an alarm condition can be highlighted.

Unit 18 can also include one or more databases such as database D1 which can include static information concerning building B1 and/or a pre-created multi-story rendering of the floors of the building B1 in accordance with the present invention and methodology as described subsequently.

Database D2 can incorporate real time dynamic information relative to conditions within the building B1. Such information can include identification of those detectors of the plurality 14 which may be indicating an alarm condition as well as time of entering that state, fire fighter location and related information as would be understood by those of skill in the art.

It will be understood that the system 10 is exemplary only and is not a limitation of the present invention. Further, the type and nature of the detectors in plurality 14 include without limitation those types of ambient condition detectors as would be understood by those of skill in the art to be of interest in monitoring building conditions or the like. For example, the members of the plurality 14 could be security related detectors which include motion sensors, position sensors and the like for purposes of securing the building B1. In such embodiments, the software 20*d* could in turn display activated security related alarms indicating paths of movement of one or more individuals in the building. Thus such information could also be combined with information from other members of the plurality 14 including fire detectors of all types, gas detectors and the like all without limitation.

Figure 2:
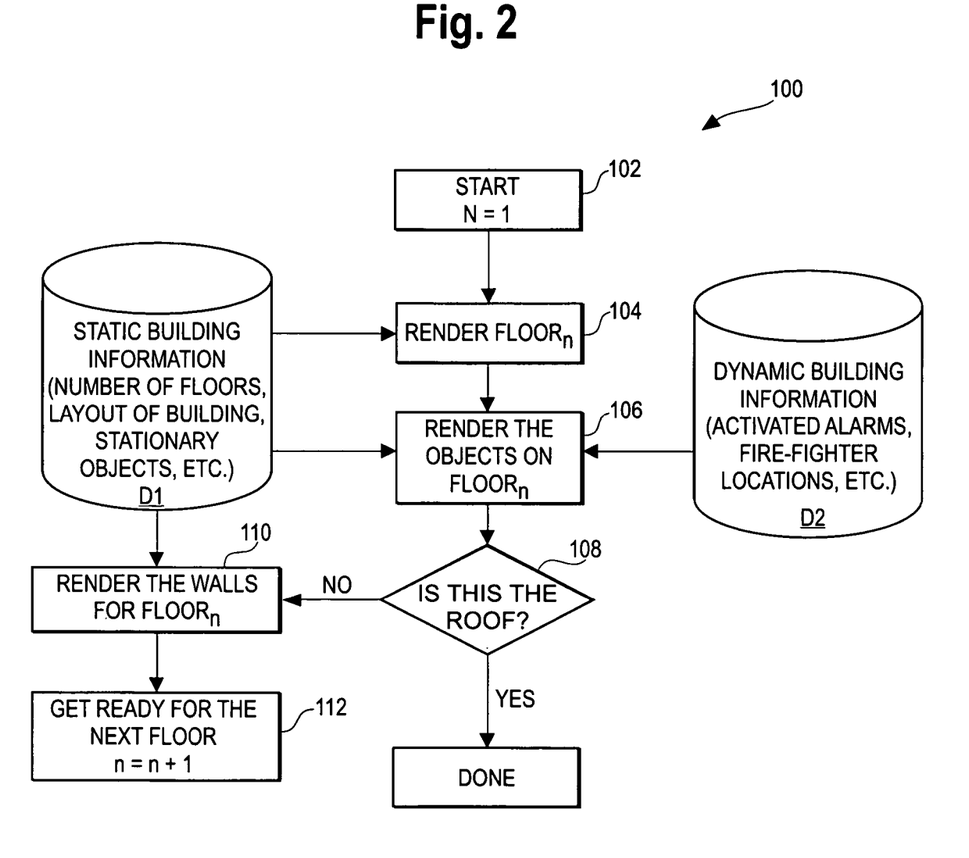
FIG. 2 is a flow diagram of a method in accordance with the invention.

FIG. 2 illustrates a process 100 for rendering the building B1 as a substantially transparent image which could be presented on the display 20*e* for use by first responders in the event of an emergency. The process 100 can be implemented off-line for purposes of creating renderings of the various floors of the building B1 and then stored in a local database such as a database D1 for subsequent presentation on the display 20*e* as needed. Alternately, the software 20*d* can carry out the rendering process based on static building information stored in the database D1. It will be understood that no limitation is intended and relative to when and where the rendering of the building B1 is created.

The rendering of the building B1, in accordance with the process 100 takes place one floor at a time starting at the first floor of a multi-floor building. A floor number, n is set to "one" step 102.

Figure 3:
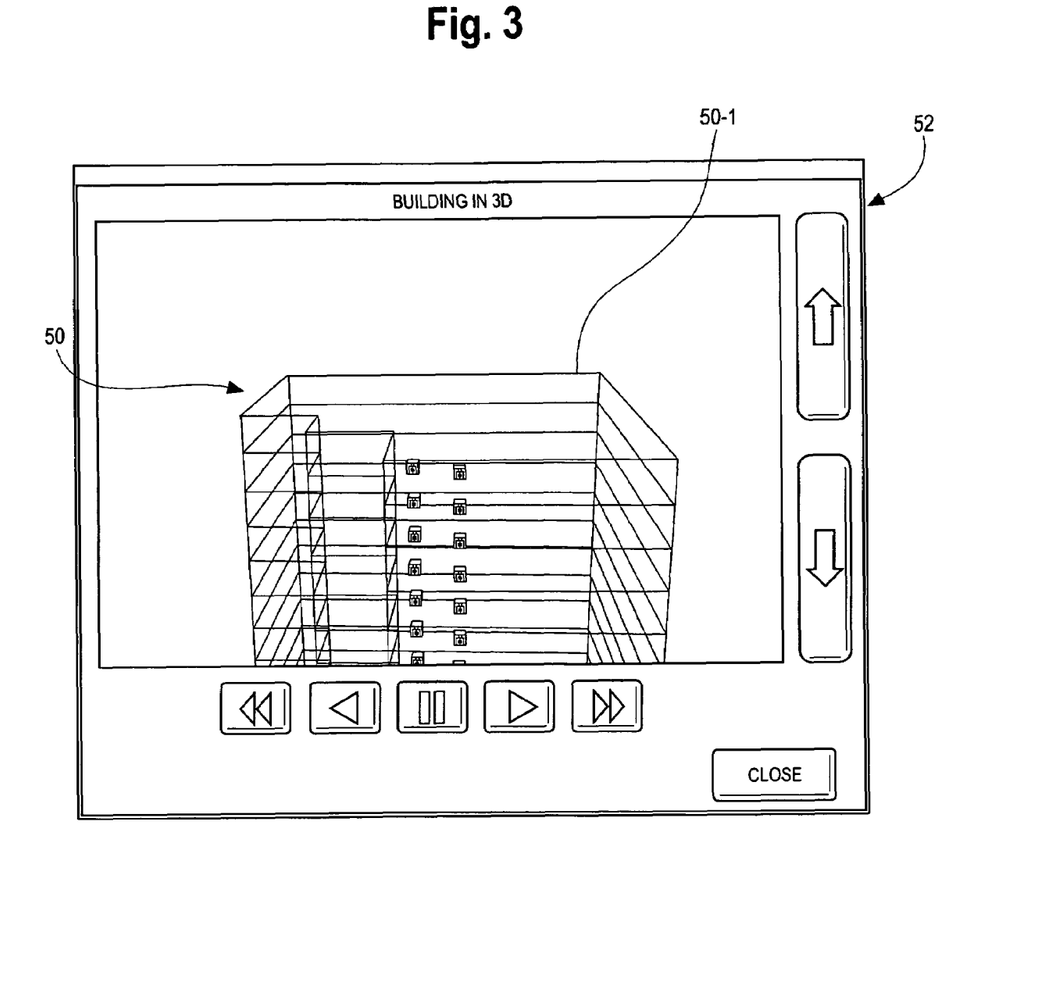
FIG. 3 is an image of one step in the method of FIG. 2.

In a second step 104, the floor is rendered. For example, see rendering 50 in FIG. 3 for a floor 50-1 presented on a representative screen 52 of a unit such as unit 20*e*. As illustrated in FIG. 2, static building information to render the current floor, as in step 104, is provided from the pre-stored database D1 which includes the static information necessary to specify the building B1.

Figure 4:
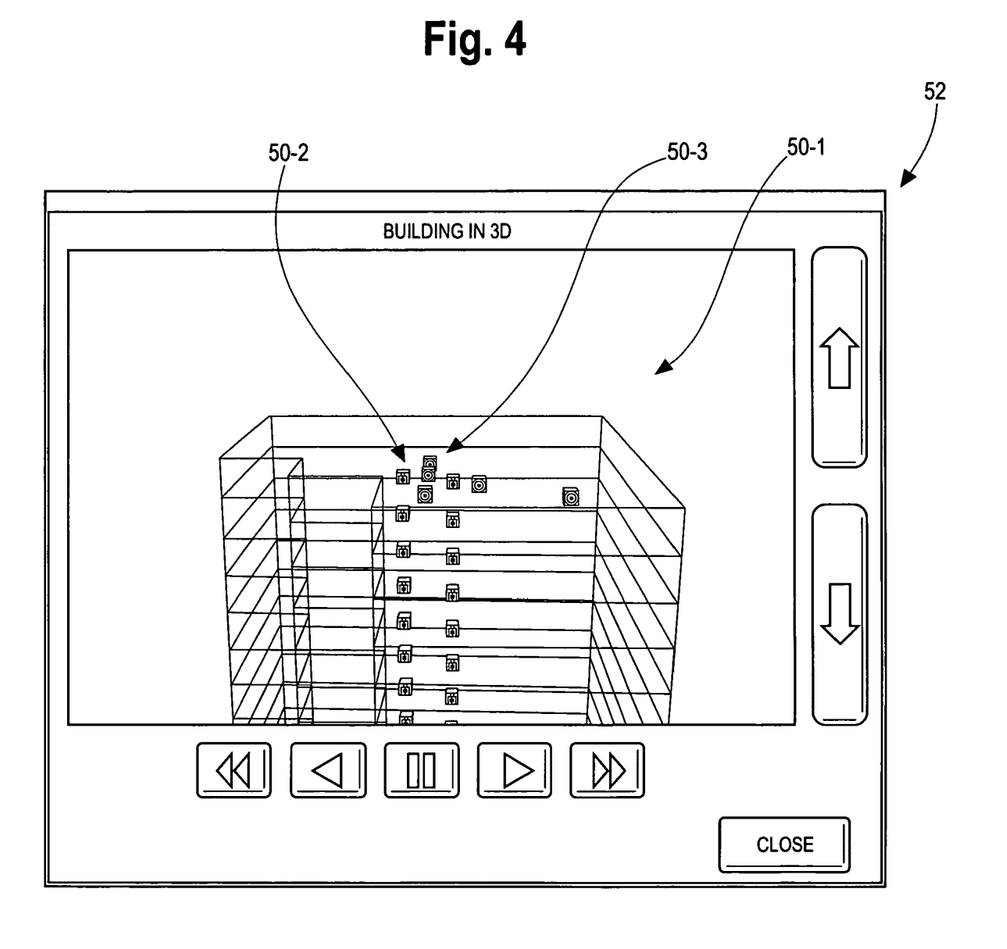
FIG. 4 illustrates another step of the method of FIG. 2.

In a step 106 static objects from database D1 can be rendered relative to the current floor 50-1 as illustrated in FIG. 4. Objects can include those structures of static or substantially permanent nature on a given floor such as stairs or elevators 50-2 as well as ambient condition detectors, alarm indicators such as sounders, voice output devices, strobes and the like all without limitation 50-3.

It will be understood that in the step 106 static location information can be obtained and utilized from database D1. Where the rendering is to include real-time condition or status information, the database D2 can be accessed for information pertaining to activated alarms, activated output devices, first responder locations (based on wireless communications) and the like all without limitation. Such information can be provided on a real-time or substantially real-time basis of if desired while the rendering is being created and subsequently at the display 20*e* or at any desired displaced location.

In a step 108 a determination is made as to whether all floors have been rendered in which case the image of the building is complete. In such event the image is available for rotation or analysis by first responders or other involved parties.

Figure 5:
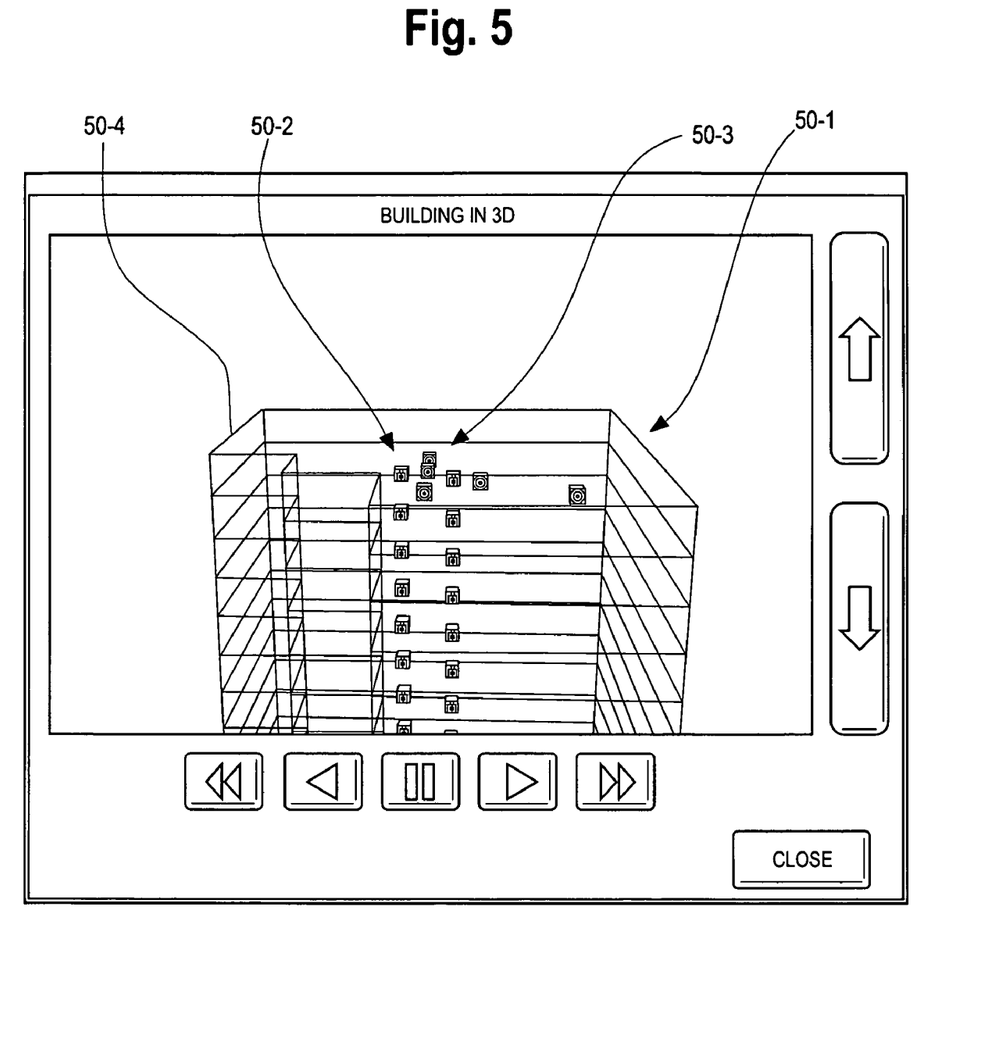
FIG. 5 illustrates a third step of the method of FIG. 2.

In the event that the rendering is not complete, the walls for the current floor are rendered, step 110, best seen in FIG. 5, wall 50-4. The walls can be rendered in any order. Subsequently the floor number is incremented, step 112 and the process is repeated until the roof is encountered, step 108.

Figure 6A:
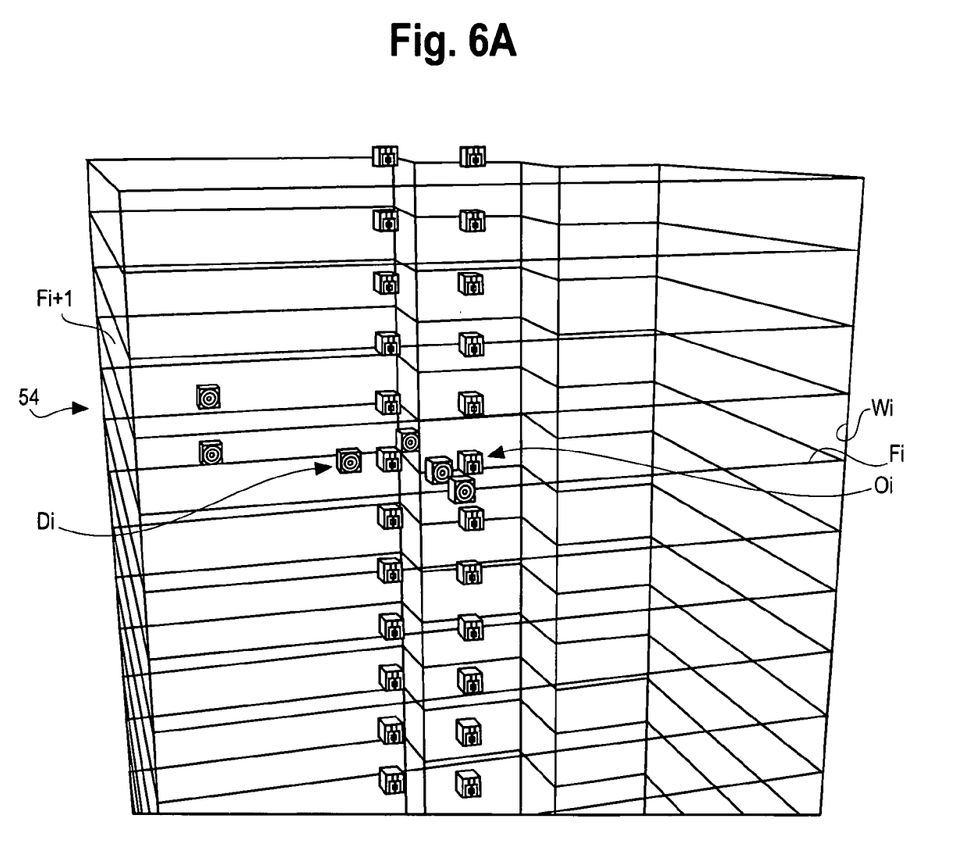
FIGS. 6A, 6B illustrate various views of a rendering of a building as in FIG. 1.

FIG. 6A illustrates an exemplary completed rendering 54 on a display such as the local display 20*e* or a displaced display. As illustrated in FIG. 6A, each of the floors, such as floor Fi is first rendered then object representations such as elevators; stairs or the like Oi, objects such as ambient condition detectors, or output devices, Di as well as sources of a type worn by first responders and the like all without limitation are located and displayed on the respective floor. The floor Fi is then bounded by the respective walls Wi which are rendered subsequent to the floor Fi and the related objects Di, Oi.

Figure 6B:
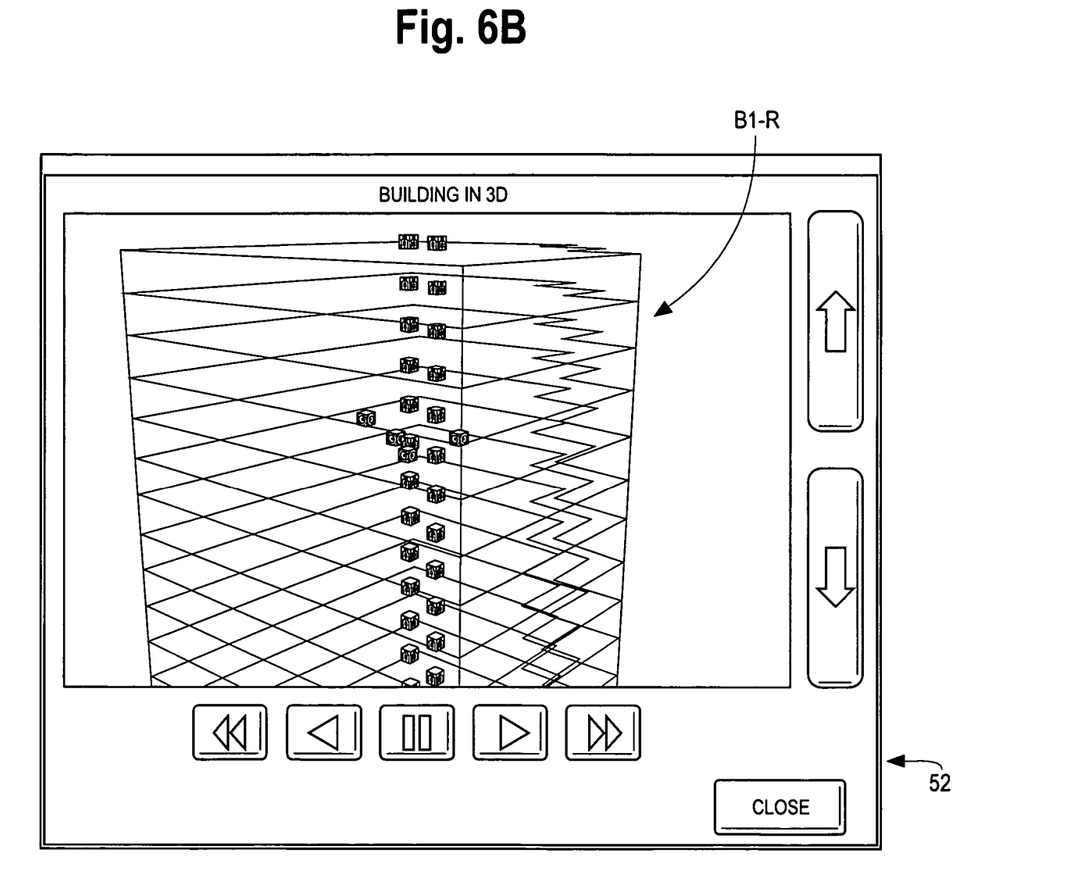

FIG. 6B illustrates rendering B1-R, the same building rendering as in FIG. 6A from a different view and with a different degree of magnification. Those of skill will understand that the software 20*d* can rotate the respective rendering as well as magnify some or all of it for purposes of examination.

It will be understood that the displays of FIGS. 6A and 6B can be particularly useful and are beneficial to viewers since the respective building renderings are presented as if building B1 was constructed of a translucent material, such as a gray tinted plastic. The configuration of the rendering of B1-R which involves a three-dimensional perspective rendering of the building B1 with translucent walls makes it possible to convey the position of objects within the building in addition to the shape of the building. Further, the ability to rotate the rendering B1-R via software 20*d* along with associated objects, can clarify the positions of the objects relative to the various floors. Ongoing trends in the building can be displayed in proper spatial relationship to floors or objects.

It is a further advantage of the renderings of the method 100, as illustrated in FIG. 6B, that the respective building can be rendered in a translucent light gray color. This avoids problems with the walls discoloring or occluding representations of objects in the building. Further, the floors can be rendered darker than the walls. This has the advantage that the darker tint to the walls visually anchors the objects to a particular floor in vertical space as opposed to presenting a "floating" image.

Rendering errors are reduced in accordance with the method 100. Minimal inaccuracies might occur where a wall is located behind an object on the same floor. In this case, the object will tend to contribute its color to the object. This effect can be minimized with the use of faint wall images.

Figure 7A:
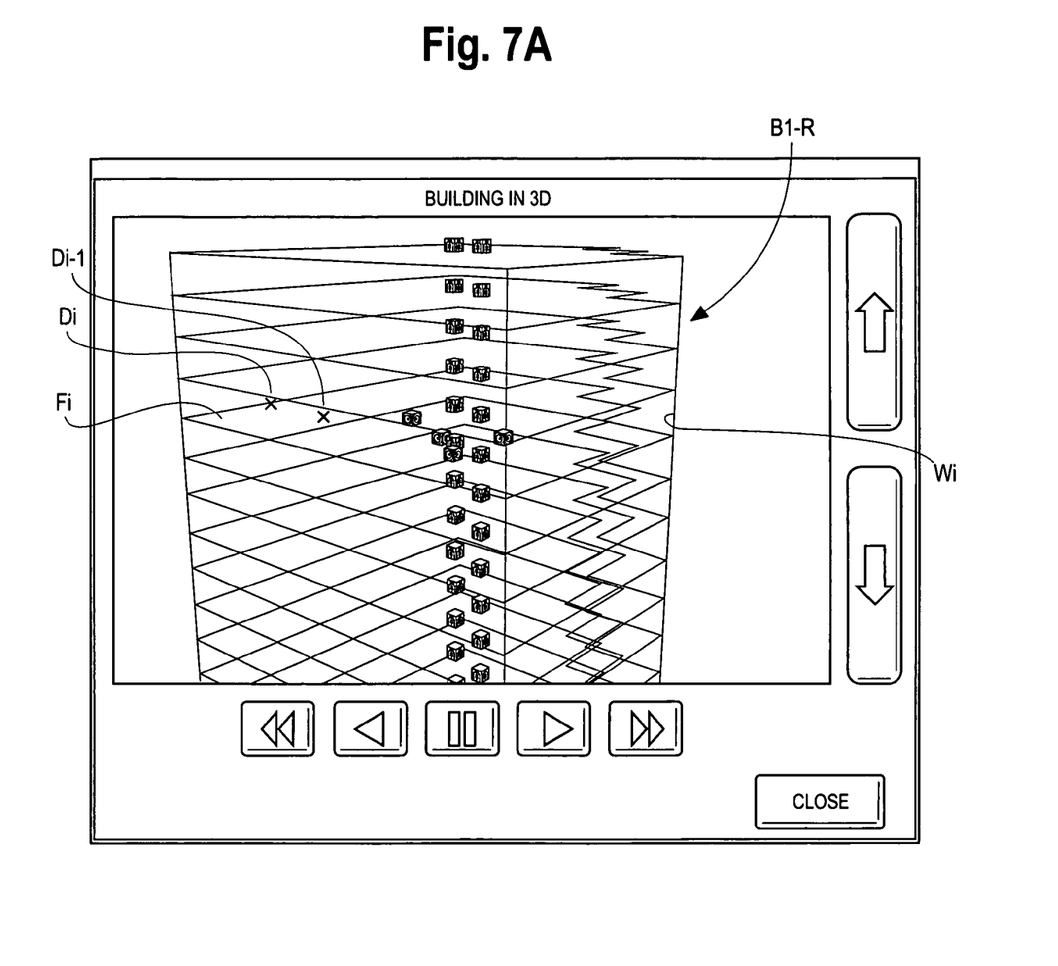
FIG. 7A, 7B, 7C taken together illustrate developing emergency indicating trends incorporated in the rendering of a building of FIG. 1.
Figure 7B:
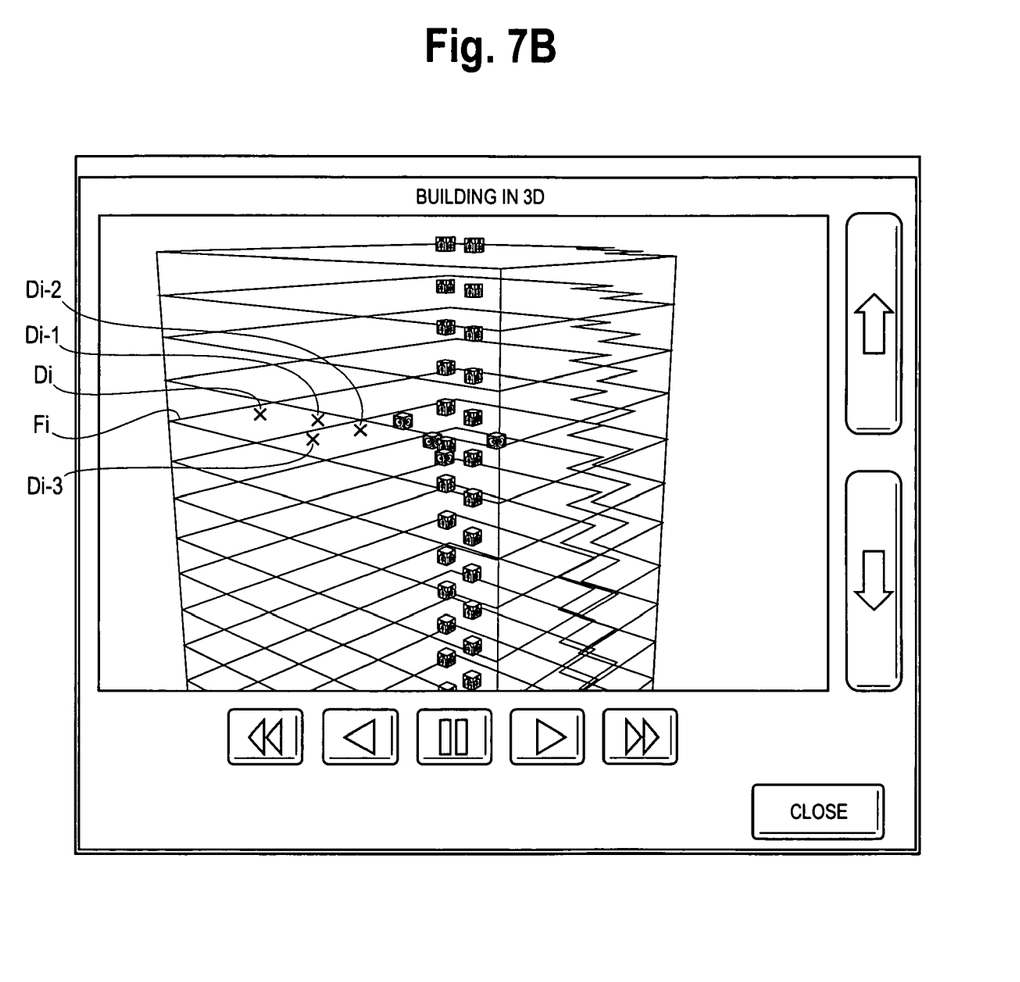
Figure 7C:
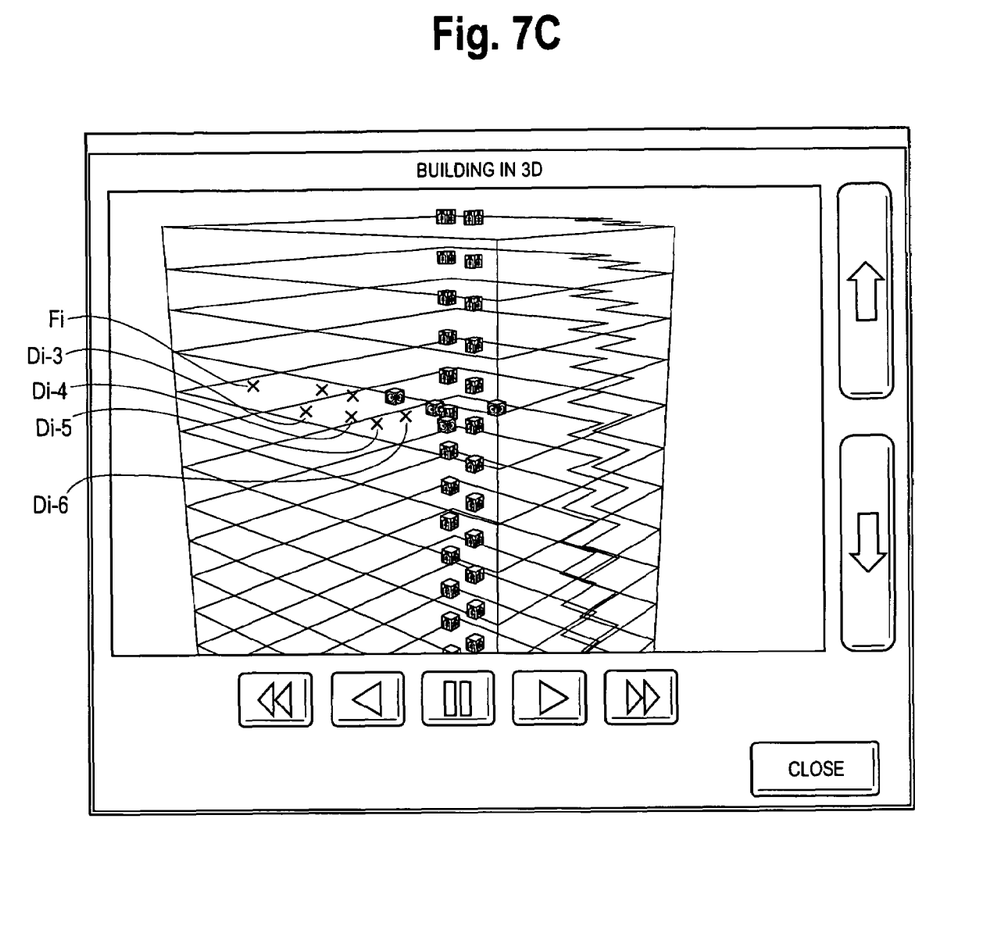

FIGS. 7A, 7B and 7C taken together illustrate the presentation of developing trends, in real-time or substantially real-time based on a combination of static building information, database D1, as well as feedback from members of the plurality 14 as to detectors indicating an alarm condition. As illustrated in FIG. 7A, detectors Di, Di-1 are exhibiting an alarm condition and would be presented on the display 20e in an active or alarm state.

In FIG. 7B displayed subsequently in time, the same detectors continue to be in an alarm state and detectors Di-2 and Di-3 have now started exhibiting an alarm state. Finally, in FIG. 7C additional detectors Di-4, Di-5 and Di-6 are exhibiting an alarm state and indicating a definite direction and trend as to the developing emergency condition. It will be understood, as discussed above, that the software 20d can then be used to rotate the rendering B1-R to provide a clearer understanding of the relationship between the active detectors and other objects on floor Fi.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
control circuitry acquiring information relative to a floor of a building to be rendered;
providing a plurality of ambient condition detectors scattered throughout the building with at least some of the plurality associated with the floor;
control circuitry monitoring an environment of the building via the ambient condition detectors;
control circuitry establishing a visual display of a substantially transparent floor in response to acquired information;
control circuitry locating selected objects including the ambient condition detectors relative to the floor on the visual display in response to acquired information;
control circuitry presenting in substantially real-time on the visual display a state of at least some of the located selected objects including the monitored ambient condition detectors wherein an alarm state of the ambient condition detectors is highlighted.

2. A method as in claim 1 which includes surrounding the floor and the objects with a plurality of walls.

3. A method as in claim 1 which includes establishing a building specifying database.

4. A method as in claim 3 where acquiring includes accessing the building specifying database.

5. A method as in claim 3 where acquiring includes accessing the building specifying database for multi-floor building information.

6. A method as in claim 2 which includes establishing another substantially transparent floor spaced from the substantially transparent floor element by the walls.

7. A method as in claim 2 which includes establishing a plurality of floor and wall combinations with each floor spaced apart from at least one other floor by an intervening wall.

8. A method as in claim 7 which includes establishing floor and wall combinations with at least some of the floors spaced apart from adjacent first and second floors by intervening walls.

9. A method as in claim 8 which includes providing graphical indicia as to states of at least some of the objects.

10. A method as in claim 8 which includes displaying fire detectors installed on respective of the rendered floors.

11. A method as in claim 10 which includes displaying indicia that identify activated fire detectors.

12. A method as in claim 1 which includes providing dynamic building information indicative of the status of at least some of the objects.

13. A method as in claim 12 which includes displaying indicators indicative of status of at least some of the objects.

14. A method as in claim 1 where locating includes displaying locations of ambient condition detectors on the floor.

15. A system comprising:
a plurality of ambient condition detectors;
a first database of building characteristics including a location and arrangement of the ambient condition detectors;
first software that establishes a translucent representation of at least one selected floor of the building in response to building characteristics;
second software that locates objects from the first database on the selected floor, that monitors environment conditions throughout the building via the ambient conditions detectors and that presents a state of at least some of the located objects including the ambient condition detectors substantially in real-time wherein an alarm state of the ambient condition detectors is highlighted; and
third software that establishes a representation of walls for the selected floor.

16. A system as in claim 15 which includes a second database of dynamic building characteristics.

17. A system as in claim 16 which includes additional software to incorporate status information from the second database into the representation of the selected floor.

18. A system as in claim 15 which includes a display device and further software to present the representation as a multi-dimensional image.

19. A system as in claim 18 which includes software for rotating at least the multi-dimensional image.

20. A system as in claim 18 which includes software to activate objects presented on the display in response to environmental conditions.

21. A system as in claim 20 which includes a displaying trend information relative to activated objects.

22. A system as in claim 18 wherein the software presents the representation as a multi-floor building.

23. A system as in claim 22 which includes a second database of dynamic building conditions.

24. A system as in claim 23 which includes presenting animated objects on respective floors of the building.

25. A system comprising:

a plurality of ambient condition detectors;

control circuitry in communication with the detectors, including first software that, at least in part monitors environmental conditions via the ambient condition detectors throughout a region being monitored and that detects the presence of an alarm condition in the region being monitored by at least some of the detectors;

second software for visually presenting a semi-transparent representation of at least a portion of the region being monitored;

the presentation having a first formed floor element, secondly formed objects including at least some of the ambient condition detectors located relative to the floor element, a state of at least some of the formed objects presented substantially in real-time wherein an alarmed state of the at least some ambient condition detectors is highlighted and a subsequently formed wall element that bounds the floor element at least in part.

26. A system as in claim 25 where some of the objects correspond to respective ones of the ambient condition detectors and which includes software to provide visual indicia of status of detectors indicating a local alarm condition located adjacent to a portion of the floor element.

27. A system as in claim 25 where the second software visually presents a plurality of floor elements spaced apart by respective later formed wall elements.

28. A system as in claim 27 which includes at least one of third software to rotate the plurality of floor elements, or, fourth software to enlarge and reduce at least portions of the plurality.

29. A system as in claim 28 which includes a database of variable environmental conditions associated with at least some of the detectors.

30. A system as in claim 29 where at least some of the detectors are selected from a class which includes thermal detectors, gas detectors, smoke detectors, water-flow detectors, motion detectors and position detectors.

31. A system as in claim 25 where the second software retrieves a pre-stored form of the representation prior to presenting it.

32. A system as in claim 31 which includes software that associates a status indicator with at least some of the objects.

* * * * *